Figure 1:
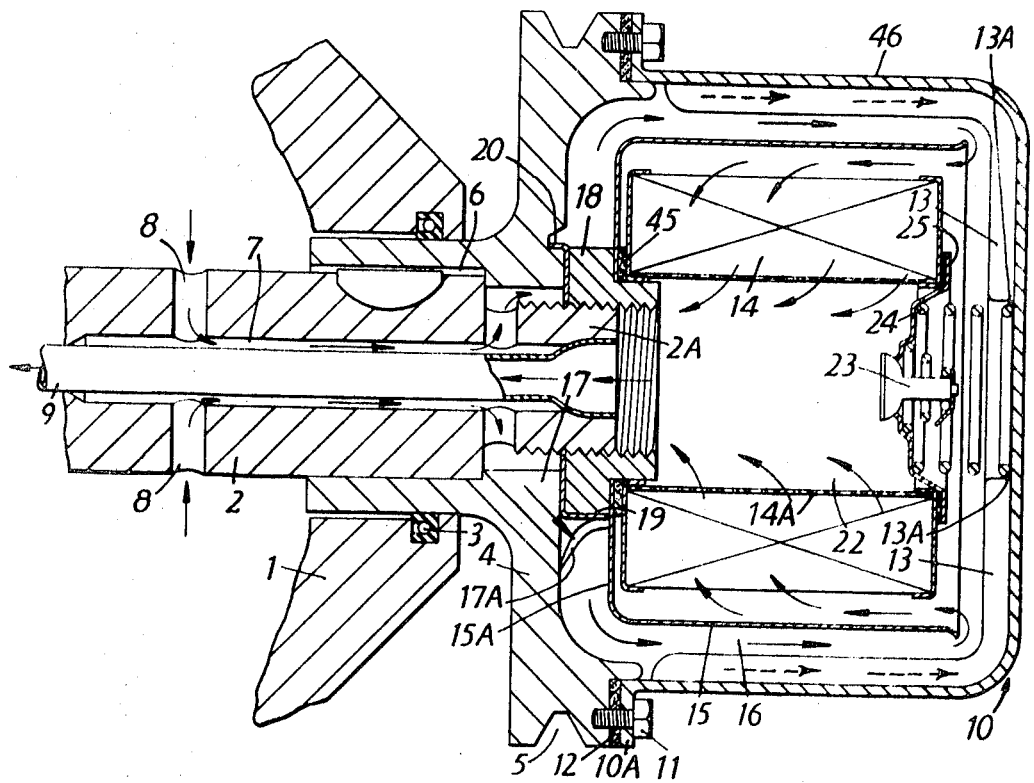

United States Patent

[11] 3,599,792

| [72] | Inventor | Peter William Stripp |
| | | Crownhill, Plymouth, Devon, England |
| [21] | Appl. No. | 731,935 |
| [22] | Filed | May 24, 1968 |
| [45] | Patented | Aug. 17, 1971 |
| [73] | Assignee | Tecalemit (Engineering) Limited |
| | | Plymouth, Devon, England |
| [32] | Priority | June 5, 1967 |
| [33] | | Great Britain |
| [31] | | 25,854/67 |

[54] CENTRIFUGAL FILTER ASSEMBLY WITH RELIEF VALVE
11 Claims, 3 Drawing Figs.

[52] U.S. Cl. .................................................... 210/130,
   210/168, 210/297, 210/306, 210/360
[51] Int. Cl. ....................................................... B01d 35/02
[50] Field of Search ........................................... 210/77,
   130, 136, 184, 300, 302, 294, 297, 299, 304, 305,
   306, 310, 320, 360, 360 A, 78, 168; 233/2

[56] References Cited
UNITED STATES PATENTS
2,670,849  3/1954  Dunmire .................. 210/306 X

| 2,822,926 | 2/1958 | Walton et al. ................. | 210/305 |
| 2,983,384 | 5/1961 | Winslow ....................... | 210/305 X |
| 3,272,336 | 9/1966 | Humbert, Jr. ................. | 210/304 X |
| 148,513 | 3/1874 | Senderling .................... | 210/360 A |
| 3,347,380 | 10/1967 | Alsobrooks .................. | 210/130 |
| 3,385,517 | 5/1968 | Carmion ....................... | 233/2 |
| FOREIGN PATENTS | | | |
| 539,341 | 4/1957 | Canada ......................... | 210/299 |
| 569,211 | 1/1959 | Canada ......................... | 210/295 |
| 904,983 | 9/1962 | Great Britain ................. | 210/130 |
| 736,002 | 6/1943 | Germany ....................... | 210/168 |

Primary Examiner—Frank A. Spear, Jr.
Attorney—Mason, Kolehmainen, Rathburn and Wyss ABSTRACT: An improved fluid filter in which the casing is rotatable so that the filtering action is improved due to the rotational forces acting on the contaminant particles in the fluid. The rotational forces also remove contaminant on the filter element so as to effect a cleaning action on the element and give more efficient filtering. Preferably, the lubricant flow is directed past the contaminant retaining portion so that a primary coarse filtering action is obtained before the lubricant passes to the filter element.

INVENTOR:
PETER W. STRIPP

INVENTOR:
PETER W. STRIPP

CENTRIFUGAL FILTER ASSEMBLY WITH RELIEF VALVE

This invention relates to fluid filters which are usable as oil filters which are adapted to be mounted on a rotating body, for example the crankshaft of an engine so that the filter is rotated about an axis as the crankshaft (for example) rotates. The oil filters to which this invention relates may be of the full flow or bypass type.

The invention provides a fluid filter for lubricants comprising an open ended casing, adapted to be mounted on a rotating body, containing a filter element and a contaminant retaining part which retains contaminant removed from the lubricant by rotational forces.

The filter element may be of a cylindrical shape disposed coaxially in the casing and the filter may include a bypass valve so that the filter element can be bypassed by the fluid stream. The contaminant retaining part is preferably attached to or forms part of the casing and may comprise longitudinal ribs inwardly directed from the inner wall of the casing.

The casing may carry external ribs preferably extending circumferentially which assist in the cooling of the lubricant passing through the filter. The casing will usually be made of die-cast metal or moulded plastic.

The invention provides a crankshaft mounted filter which retains good filtering properties when the crankshaft is rotating at relatively low speeds. The use of a crankshaft mounted filter allows a reduction to be made in the number of oil galleries in the engine block and hence a cost reduction in the engine-block manufacture is achieved.

In the filter according to the invention the oil may flow along a path adjacent the contaminant retaining part in which the contaminants are deposited by the action of centrifugal force on them. It will be appreciated that this first stage of filtration is of particular value in removing the larger sizes of contaminant particle from the lubricant and thus the filter element to which the lubricant then passes has to remove the smaller contaminants.

The filter element is self-cleaning to some extent because the contaminants retained in the element are subjected to centrifugal force and therefore may move radially out from the element and be deposited on the contaminant retaining part or another part positioned outwardly of the element. This self-cleaning action may allow some reduction in the size of the element leading to a more compact form of element.

The plate onto which the filter is mounted will normally have a peripheral groove for the reception of a belt drive to accessory equipment.

The casing of the filter is attachable to the baseplate by various means but a preferable construction includes a bolt extended through the filter along its axis of rotation. This bolt mates with a threaded section of the baseplate and removal of the center bolt allows the filter to be removed for cleaning of the casing and inspection of the filter element.

In another type of attachment the casing has a threaded peripheral portion which mates with a corresponding portion on the baseplate. O-ring seals are provided where necessary and screw threads are of opposite hand to rotational direction to give self-tightening.

Figure 2:
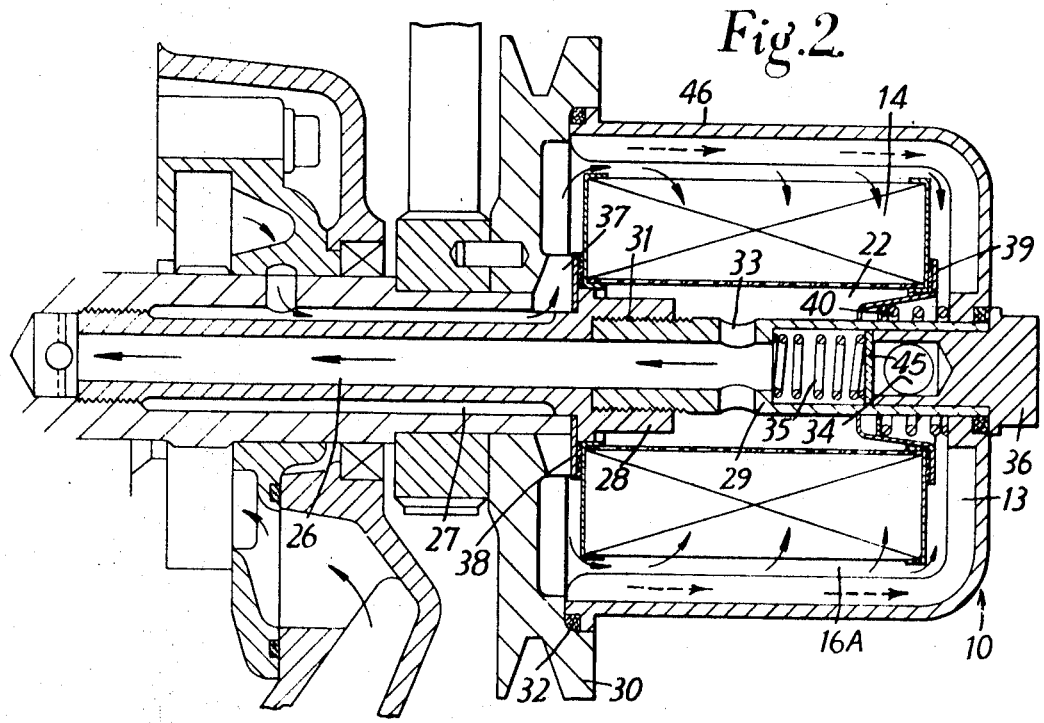
Figure 3:
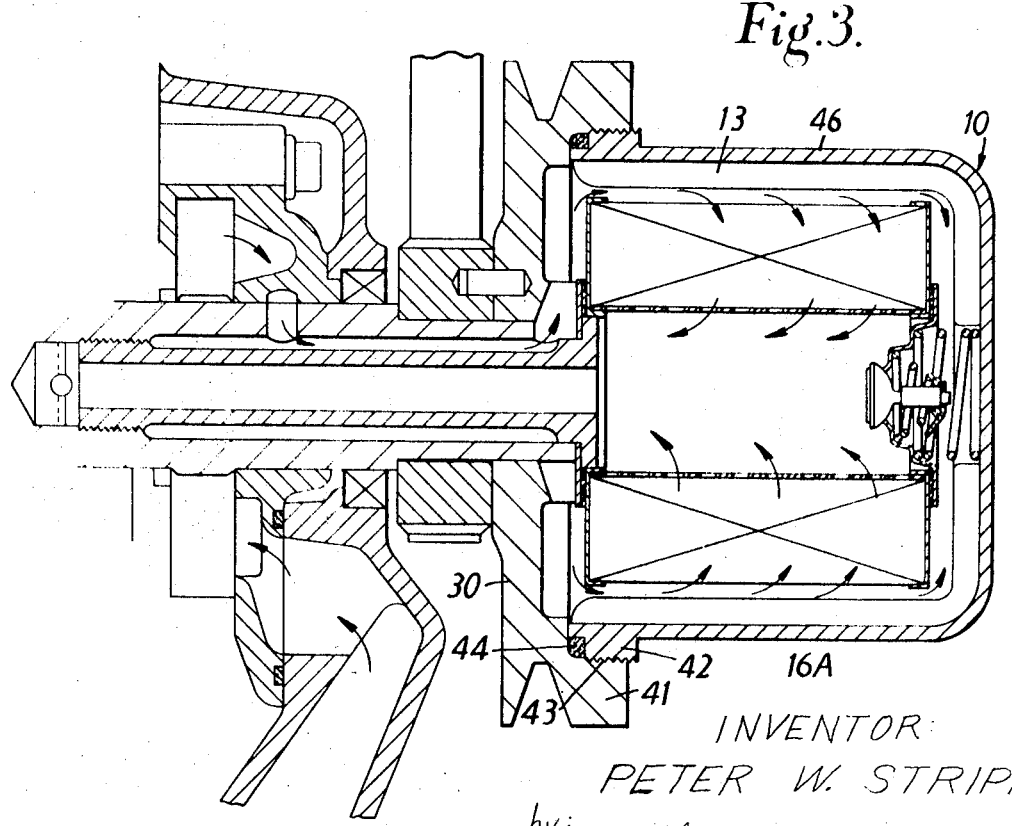

Embodiments of filters according to the invention will now be described by way of example with reference to the accompanying drawings in which FIGS. 1, 2 and 3 show longitudinal sections through three embodiments.

A centrifugal filter (see FIG. 1) is attached to a baseplate 4 which is attached to a shaft 2 integral with the crankshaft of an engine. The disc-shaped plate 4 is carried on bearings 3 in the crankcase 1 of the engine. A pulley groove 5 of annular shape is formed on the periphery of plate 4 so that accessories, for example, a dynamo and a fan can be driven when the shaft 2 is rotated. The plate 4 is attached to the shaft 2 over a threaded length 6, the direction of thread being such that the connection tightens when the shaft rotates. The shaft 2 carries a bore 7 through which oil may pass from the engine, being supplied through an oil duct 8. Within the bore 7 is coaxially disposed an oil output tube 9 through which filtered oil returns to the engine.

The oil filter comprises an open ended cylindrical casing 10 positioned to have its open end facing the plate 4. An integral outwardly directed flange 10A extends from the casing at its open end and is adapted to abut an annular surface of the plate 4; the casing 10 is secured to the plate with the aid of threaded bolts 11 and between the flange 10A and the plate there is disposed a gasket 12 to seal the joint. The cylindrical wall 46 of the casing 10 receives the contaminant removed from the lubricant by rotational forces.

A plurality of fins 13 extends longitudinally from the open end of the casing towards and onto the closed end of the casing and terminate along a circle 13A. A cylindrical filter element 14 is positioned coaxially within the casing within an oil guide 15 and the internal surface of the filter element is covered by apertured cylinder 14A. The oil guide 15 comprises a cylindrical part with an inwardly directed flange 15A, which is disposed near the baseplate. Between the cylindrical part of the oil guide and the casing exists an oil channel 16 of annular section into which project the fins 13. An oil input port 17 is formed in the baseplate 4 to allow oil to pass from the bore 7 into the oil channel 16. A conventional nonreturn valve 17A formed by a rubber flap is positioned in the port 17. The oil guide 15 abuts an annular sealing ring 18 which has a ring cover 19. The sealing ring and its associated cover separate the oil passing through the port 17 from the filtered oil which passes through the oil output tube 9 through a shaft extension 2A. The ring cover 19 has a location part 20 which is located in a recess in the plate 4 and which allows the correct orientation of the filter to be made before tightening the screws 11. Between the filter element 14 and the oil guide flange 15A is positioned a resilient O-ring 45.

At the closed end of the casing a bypass valve 23 is disposed within the element 14 and retained in position by a helical retaining spring 24 which is tensioned against a plate 25. The valve 23 allows the oil flow to bypass the filter element 14 if the filter becomes blocked by contaminants. The spring 24 is positioned in the circle 13A, and the plate 25 also retains the element 14 in position.

When the shaft and its attached plate 4 are rotated by the engine oil flows through the port 17 into the oil channel 16 towards the closed end of the casing. The oil then moves inwardly inside the oil guide 15 and passes through the filter element 14 into a central space 22. From this space the filtered oil is returned to the engine through the oil output tube 9.

The ribs 13 act as a primary filter for the oil by retaining contaminants carried in the oil stream and moved outwards to the inner wall of the casing wall 46 by centrifugal action. Thus some of the contamination carried by the oil stream is removed before the oil passes through the element 14.

From the figure it will be seen that the oil follows the channel 16 between the casing 10 and the oil guide 15; thus all the oil passing through the filter is subjected to this primary filtering action;

The filter element 14 may be made of conventional type. Thus a pleated media giving mainly surface filtration or depth filter of compacted fiber may be used. Alternatively, a disc or ribbon element can be used, which gives edge filtration. The disc-type element is preferred due to its high strength factor and ability to stand high internal and external pressures. The lubricant to be filtered is passed through the filter with the aid of a pump which is not shown.

In FIG. 2 there is shown a sectional view of a centrifugal filter which is similar to that shown in FIG. 1. However, while the arrangement of the filters within the casing are the same as that shown in FIG. 1, the method of attachment of the casing 10 to the baseplate 30 is different.

An oil input duct 27 is formed coaxially in the crankshaft with an oil output duct 26. The duct 27 connects with an oil channel 16A through a port 37. A casing 10 abuts the baseplate 30 and the seal between them made liquid tight by means of a resilient O-ring 32. The tube separating the ducts 26 and 27 has an extension 28 which extends within the casing 10. A center bolt 29 is screwed on to the extension 28 over a threaded length 31. The center bolt 29 is bored and has a port 33 which connects the central space 22 of the filter with the output duct 26. The center bolt 29 is connected to the casing 10 by an end bolt 36. Within the bore of the center bolt is contained a pressure relief valve which is formed by a flap 45 biased towards the bolt 36 by a spring 35. The oil passes into the bore via an aperture 34 and moves flap 45 against the biasing force in spring 35 to enter output duct 26. When the filter element 14 contains a large amount of contaminant or when the engine is being started from cold the pressure relief valve opens and allows the oil to bypass the filter element. In this case the oil passes from the channel 16A through the open pressure relief valve into the output duct 26.

The filter element 14 is held in abutment with a disc 38 which extends from the side of the extension 28. The filter element is retained in position by the force of a spring 40 disposed between the closed end of the casing 10 and a flanged frustoconical retaining piece 39.

The filter can be removed from the crankshaft when desired by rotating it so that the center bolt 29 is withdrawn from threaded engagement with the shaft extension 28. The direction of thread on the length 31 is such that the center bolt tightened on the extension 28 as the crankshaft is rotated.

An oil guide 15 (see FIG. 1) is absent in this embodiment and thus a proportion of the oil does not flow along the whole length of the oil channel adjacent the ribs 13.

FIG. 3 shows a screw-on type of filter in which the casing 10 has an outwardly extending integral flange 42 at its open end which mates with a threaded flange 41 on the back plate 30. The flanges 41 and 42 contact over a threaded length 43 and a resilient O-ring 44 assists in the formation of a liquid tight seal between the back plate 30 and the casing 10.

The filters according to the invention may be used with the oil flow through the filter reversed. The element 14 used in this case is of the convoluted paper type which is attached to an end plate and has no external shroud. No nonreturn valve is necessary for this type of filter. The pleats of the convoluted element are thrown outwardly away from the direction of oil flow by centrifugal force when in operation.

Centrifugal force and movement of the pleats breaks up the material deposited in the pleats and this material is moved out by centrifugal force and deposited in the contaminant retaining part. Thus the invention provides an improved centrifugal oil filter which may be mounted on an engine crankshaft.

What I claim is:

1. A device for removing contaminant material from a fluid medium by centrifugal force and subsequent filter action comprising a body mounted adjacent one end of a rotating shaft for rotation therewith, said shaft defining a pair of coaxial passages in communication with the interior of said body for carrying fluid medium to and from said body, radial passage means in said body for directing fluid medium from one of said shaft passages radially outward upon rotation of said body, an annular collection zone defined in said body around the periphery thereof for collecting contaminant material centrifuged outwardly by rotation of said body, tubular filter means of substantial radial thickness in said body having an outer surface in communication with said zone and a hollow inner bore in communication with the other of said shaft passages for removing additional contaminant material from said fluid medium by filtering action as said medium flows radially inwardly through said filter means under pressure, annular wall means spaced outwardly of said outer surface of said tubular filter means and defining an inner wall of said collection zone for directing said fluid medium parallel of said shaft before permitting inward travel through said filter means, and relief valve means for permitting fluid medium to flow directly between said collection zone and said inner bore upon blockage of said filter means with contaminant material.

2. The filter device of claim 1 including rib means extending inwardly of the periphery of said collection zone for directing fluid means longitudinally of said body and forming channels for the collection of contaminants.

3. The filtering device of claim 1 wherein said body comprises a baseplate extending radially outward of said shaft and a cup-shaped receptacle removably secured to said baseplate forming an outer wall of said collection zone.

4. The filtering device of claim 3 including support means for supporting said tubular filter means independently of said cup-shaped member whereby the latter can be removed from said baseplate for cleaning.

5. The filtering device of claim 1 wherein said body includes a cup-shaped receptacle having an annular sidewall spaced outwardly of said tubular filter means and defining an outer periphery of said collection zone and a closed end wall parallel to the end of said shaft and defining a portion of said collection zone extending radially of said shaft.

6. The filtering device of claim 5 including rib means extending radially inwardly of said annular sidewall and toward said closed end wall for directing oil flow in said body.

7. The filtering device of claim 6 wherein said rib means include a portion on said closed end wall projecting inwardly of said annular sidewall toward the axis of said shaft.

8. The filtering device of claim 5 wherein said closed end wall is spaced apart from an adjacent annular end of said tubular filter means, and holding means between said closed end wall and said annular end of said tubular filter means for retaining said filter means in place in said body.

9. The filtering device of claim 8 wherein said holding means comprises resilient means exerting biasing force between said closed end wall and said annular end wall of said filter means to urge said filter means toward the opposite end of said receptacle.

10. The filtering device of claim 8 wherein said holding means includes an annular closure plate covering the outer end of said bore of said filter means.

11. The filtering device of claim 10 wherein said relief valve means is operable to open and close a bypass opening in said annular closure plate.